(12) United States Patent
Katz et al.

(10) Patent No.: US 7,720,047 B1
(45) Date of Patent: May 18, 2010

(54) MANAGING PERIODIC COMMUNICATIONS

(75) Inventors: David M. Katz, Santa Cruz, CA (US); Dennis C. Ferguson, Palo Alto, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 342 days.

(21) Appl. No.: 11/947,472

(22) Filed: Nov. 29, 2007

Related U.S. Application Data (63) Continuation of application No. 10/457,828, filed on Jun. 9, 2003, now Pat. No. 7,310,314.

(60) Provisional application No. 60/388,099, filed on Jun. 10, 2002.

(51) Int. Cl.
*H04L 12/56* (2006.01)
*H04J 1/16* (2006.01)

(52) U.S. Cl. ............ 370/351; 370/230; 370/252

(58) Field of Classification Search ........ 370/252, 370/230, 351
See application file for complete search history.

(56) References Cited

U.S. PATENT DOCUMENTS

| | | | | |
|---|---|---|---|---|
| 5,826,081 A | * | 10/1998 | Zolnowsky | 718/103 |
| 6,757,897 B1 | * | 6/2004 | Shi et al. | 718/102 |
| 2002/0120488 A1 | * | 8/2002 | Bril et al. | 705/9 |
| 2002/0141343 A1 | | 10/2002 | Bays | |
| 2003/0123457 A1 | | 7/2003 | Koppol | |
| 2005/0013310 A1 | | 1/2005 | Banker et al. | |
| 2005/0259571 A1 | | 11/2005 | Battou | |

OTHER PUBLICATIONS

U.S. Appl. No. 11/506,426, filed Aug. 18, 2006, entitled "Distributed Solution for Managing Periodic Communications in a Multichassis Routing System," to Umesh Krishnaswamy et al.

\* cited by examiner

*Primary Examiner*—John Pezzlo
(74) *Attorney, Agent, or Firm*—Shumaker & Sieffert, P.A.

(57) ABSTRACT

Techniques are described for managing periodic communications between devices. For example, a periodic packet process may receive configuration parameters from a routing protocol process. The periodic packet process may manage periodic communication sessions with neighboring devices in accordance with the configuration parameters from the routing protocol process. The periodic packet process may monitor for incoming periodic packets from a specified neighboring device in a specified periodic time interval. The periodic packet process may also send outbound periodic packets at a specified periodic time interval.

28 Claims, 9 Drawing Sheets

OUTBOUND DATA — 56

| OUTBOUND PERIODIC PACKET 1 | 5 SEC |
|---|---|
| OUTBOUND PERIODIC PACKET 2 | 8 SEC |

(A)

INBOUND DATA — 58

| 145.25.3.154 | 7 SEC |
|---|---|
| 200.1.35.168 | 3 SEC |

MANAGING PERIODIC COMMUNICATIONS

This application is a Continuation of application Ser. No. 10/457,828, filed on Jun. 9, 2003, which claims the benefit of U.S. Provisional Application Ser. No. 60/388,099 filed Jun. 10, 2002, the entire contents of each of which is incorporated herein by reference.

TECHNICAL FIELD

The invention relates to computer networks and, more particularly, to managing communications between network devices within computer networks.

BACKGROUND

A computer network is a collection of interconnected computing devices that can exchange data and share resources. In a packet-based network, such as the Internet, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

Certain devices, referred to as routers, maintain routing information that describes routes through the network. A "route" can generally be defined as a path between two locations on the network. Upon receiving an incoming packet, the router examines information within the packet and forwards the packet in accordance with the routing information.

In order to maintain an accurate representation of a network, routers typically send periodic packets to each other to communicate the state of the device. These periodic packets are sometimes referred to as "keepalives" or "hellos." For example, a first router may send a packet to a second router every five seconds to verify that the router is still operational. The first router may require the second router to respond in a certain amount of time. When a response packet is not received in the allotted time frame, the first router expecting the message may conclude a network failure has occurred, such as failure of the second router or failure of the link connecting the two routers. Consequently, the first router may update its routing information to exclude that particular link, and may issue a number of update messages to neighboring routers indicating the link failure.

However, a number of non-failure conditions may prevent the second router from responding to the first router within the required periodic response time. For example, the computing resources of the second router may be consumed due to heavy network traffic loads. In other words, with the increased amount of network traffic on the Internet, for example, many conventional routers have become so busy performing other functions, such as route resolution, that the response time to periodic packets is not sufficient. Furthermore, the increased complexity of current routers has increased the number of processes concurrently executing on the router, each of which require computing resources. In addition, there has been continual demand to shorten the allowable time to respond to such periodic messages in order to accelerate the detection of network failure conditions.

Failure to respond due to these and other conditions can result in significant network thrashing and other problems. For example, a router may have a route resolution process that requires a significant period of time, e.g., ten or more seconds, for convergence due to the complexity of the network topology. This period may exceed that allowable response time to a periodic packet. By the time the router has sufficient computing resources to respond to the periodic packet, the neighboring router may already mistakenly interpret the router or link as failed. Consequently, the neighboring router may update its routing information to exclude the "failed" router. Furthermore, the neighboring router may send update messages to its neighboring routers indicating the failure, causing its neighboring routers to perform route resolution in similar fashion. Shortly thereafter, the "failed" router may have sufficient resources to send its neighboring router a response packet indicating that it is operational. As a result, the neighboring router again updates its routing information to include the router and sends another update message to its neighbors, causing the neighboring routers to once again perform route resolution. The unnecessary route resolution and update messages cause the network routers to thrash, creating significant network delays.

SUMMARY

In general, the invention is directed to techniques for managing periodic communications between network devices. In one embodiment, the invention is directed to a method that comprises configuring a periodic packet process with a routing protocol process. The method further comprises communicating with neighboring devices using periodic communication messages. The method may also comprise receiving a packet and either discarding the packet when it is equivalent to previously received periodic packets, or communicating the packet to the routing protocol process when the packet is not equivalent to previously received packets. The method may further include tracking the amount of time since sending or receiving a periodic packet from a neighboring device. Periodic packet process may either send a periodic message to the neighboring device when a timer expires, or notify the routing protocol process that the neighboring device did not send a periodic packet when the timer expires.

In one embodiment, a network device comprises a first preemptive software process executing within an operating system executing on the network device, the first preemptive software process managing processing of non-periodic routing operations for one or more routing protocols executed by the network device. The network device also includes a second preemptive software process executing within the operating system, the second preemptive software process managing processing of at least a portion of periodic routing operations performed by the network device. The operating system transfers computing resources of the network device from the first preemptive software process to the second preemptive software process for processing of the periodic routing operations prior to the first preemptive software process finishing the processing of the non-periodic routing operations for the one or more routing protocols when the second preemptive software process has one or more periodic messages to be sent.

In another embodiment, a method for managing routing protocol communications comprises managing processing of non-periodic routing operations for one or more routing protocols executed by the network device with a first preemptive software process executing within an operating system executing on the network device. The method further includes managing processing of at least a portion of periodic routing operations performed by the network device with a second preemptive software process executing within the operating system. The method also includes transferring computing resources of the network device from the first preemptive software process to the second preemptive software process to process the periodic routing operations prior to the first preemptive software process finishing the processing of the non-periodic routing operations for the one or more routing protocols when the second preemptive software process has one or more periodic messages to be sent.

In another embodiment, a computer-readable storage medium comprises instructions that cause at least one processor to manage processing of non-periodic routing operations for one or more routing protocols executed by the network device with a first preemptive software process executing within an operating system executing on the network device, manage processing of at least a portion of periodic routing operations performed by the network device with a second preemptive software process executing within the operating system, and transfer computing resources of the network device from the first preemptive software process to the second preemptive software process to process the periodic routing operations prior to the first preemptive software process finishing the processing of the non-periodic routing operations for the one or more routing protocols when the second preemptive software process has one or more periodic messages to be sent.

In another embodiment, a network device comprises a first preemptive software process executing within an operating system executing on the network device. The preemptive software process includes a plurality of threads executing within the first preemptive software process to manage processing of non-periodic routing operations for one or more routing protocols executed by the network device, wherein the plurality of threads require execution within a non-preemptive environment and a scheduler that schedules the plurality of threads such that each of the threads executes to completion without preemption by any of the other threads of the plurality of threads. The network device also includes a second preemptive software process executing within the operating system, the second preemptive software process managing processing of at least a portion of periodic routing operations performed by the network device. The operating system transfers computing resources of the network device from the first preemptive software process to the second preemptive software process for processing of the periodic routing operations prior to the first preemptive software process finishing the processing of the non-periodic routing operations for the one or more routing protocols when the first preemptive software process has one or more periodic messages to be sent.

The invention may provide one or more advantages. For example, the techniques may increase the number of simultaneous periodic communication sessions a router may perform. The techniques may further prevent the router from thrashing, which can lead to significant network delays. The techniques may lead to reduced update packets sent over the network.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
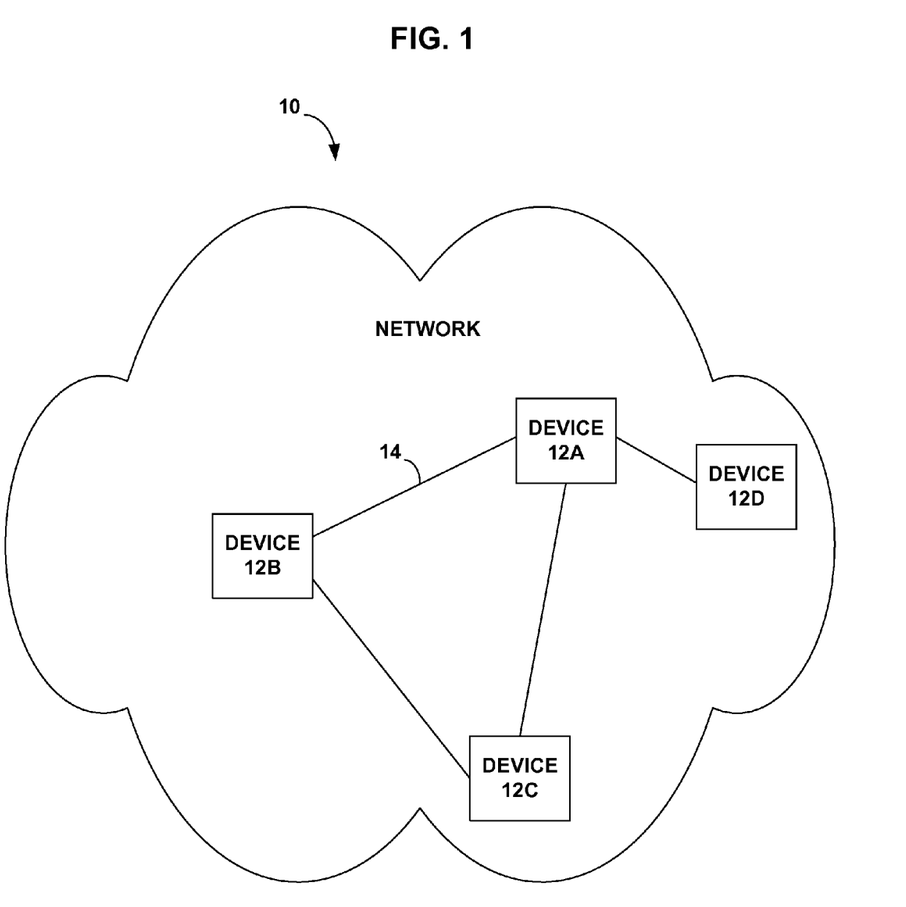
FIG. 1 is a block diagram illustrating an exemplary computer network having routers that processes periodic packets in a manner consistent with the principles of the invention.

FIG. 1 is a block diagram illustrating an example computer network 10 comprising network devices 12A to 12D, collectively referred to as network devices 12. Network devices 12 communicate data within computer network 10, and may include network routers, network hubs, network switches, and the like. Network devices 12 may send periodic data, such as packets, to one another in order to maintain an accurate representation of the topology of network 10. For example, network devices 12 may exchange periodic communications using one or more routing protocols, such as Open Shortest Path First (OSPF) or Intermediate System—Intermediate System (ISIS). Network devices 12 may further use periodic communication when using Media Access Control (MAC) layer protocols such as Frame Relay LMI, point-to-point protocol (PPP) and the like. As an example, network device 12B may send a "keepalive" packet every three seconds to both devices 12A and 12C to indicate that device 12B is in an "active" state. The periodic response time to a periodic packet is typically dependent on the protocol being used between devices 12.

In the event device 12A does not receive a periodic packet from device 12B within a periodic interval, e.g., three seconds, device 12A may assume that network device 12B has failed. The failure of device 12B may be due to an actual network event, such as the failure of a link 14. However, the failure of device 12B to respond may be caused by non-failure conditions, such as lack of computing resource of device 12B. Upon failure to receive a periodic packet from device 12B, device 12A may perform route resolution by invoking a path selection algorithm for each known destination affected by the network event until new paths for each known destination are selected. Furthermore, network device 12A may broadcast update messages informing devices 12C and 12D to withdraw the routes that make use of device 12B and, more particularly, link 14.

Network devices 12 manage the time critical periodic messages with a periodic packet management process executing within devices 12. A router protocol process, also executing within network devices 12, configures the parameters of the periodic packet management process. In general, the periodic management process manages inbound and outbound periodic communication sessions, while the routing protocol process implements the complex routing protocols and other functions.

Figure 2:
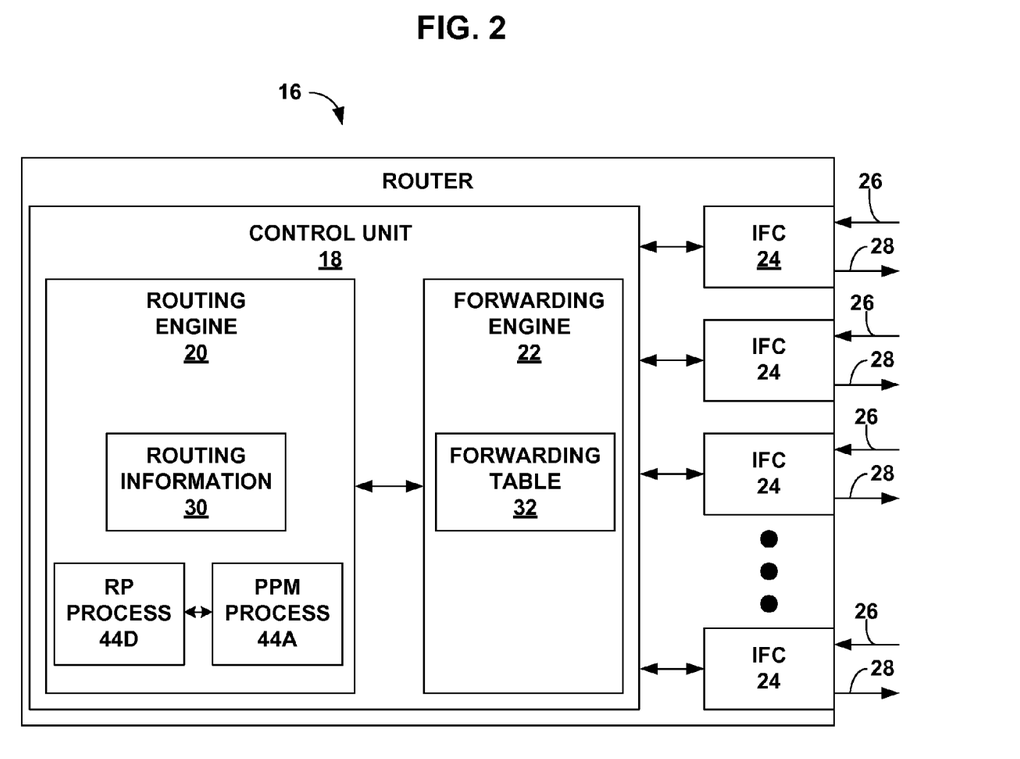
FIG. 2 is a block diagram illustrating an example network router that processes periodic packets in a manner consistent with the principles of the invention.

FIG. 2 is a block diagram illustrating an example network router 16 that communicates with neighboring routers using periodic packets in accordance with the principles of the invention. Network router 16 comprises a control unit 18 that includes a routing engine 20 and a forwarding engine 22. Router 16 further comprises a set of one or more interface cards (IFCs) 24 that receive and send packets via network links 26 and 28, respectively. IFCs 24 are typically coupled to network links 26, 28 via a number of interface ports.

Routing engine 20 is responsible for maintaining and updating routing information 30. Routing information may describe a topology of a network, and more particularly, routes through the network. For example, the routing information may include, route data that describes various routes through the network, and also next hop data indicating appropriate neighboring devices within the network for each of the routes. Routing engine periodically updates the routing information to accurately reflect the current network topology.

Routing engine 20 analyzes its stored routing information and generates forwarding information that it sends to forwarding engine 22. Forwarding engine 22 stores the forwarding information in a forwarding table 32. The forwarding information in forwarding table 32 may associate, for example, network destinations with specific next hops and corresponding interface ports of IFCs 24. Forwarding table 32 may, therefore, be thought of as a specialized variation of the routing information 30. Upon receiving an incoming packet, forwarding engine 22 directs the packet to the appropriate IFC 24 for transmission according the forwarding table 32.

Router 16 may communicate with neighboring devices using periodic messages. For example, router 16 may generate a periodic packet that indicates that router 16 is still active, and send the packet to neighboring devices at a periodic interval, say once every three seconds. Router 16 may then wait for a response from each of the neighboring network devices.

Routing engine 20 further includes a routing protocol (RP) process 44D that implements the complex routing protocols and other functions. RP process 44D communicates with a periodic packet management (PPM) process 44A. RP process 44D may communicate inbound and outbound configuration parameters to PPM process 44A. For example, RP process 44D may send PPM process 44A a fully formed packet and a periodic time interval.

PPM process 44A manages inbound and outbound periodic communication sessions with neighboring devices 12. PPM process 44A may, for example, send the packet received from RP process 44D to devices 12A and 12C according to the periodic time interval. Managing periodic communications with PPM process 44A may reduce the response time of router 16 to periodic packets, which may increase the number of simultaneous periodic communication sessions that router 16 may perform. Furthermore, PPM process 44A may prevent router 16 from thrashing, which can lead to significant network delays.

Router 16 may operate according to executable instructions fetched from a computer-readable medium. Examples of such media include random access memory (RAM), read-only memory (ROM), non-volatile random access memory (NVRAM), electrically erasable programmable read-only memory (EEPROM), flash memory, and the like. The functions of router 16 may be implemented by executing the instructions of the computer-readable medium with one or more processors, discrete hardware circuitry, firmware, software executing on a programmable processor, or a combination of any of the above.

Figure 3:
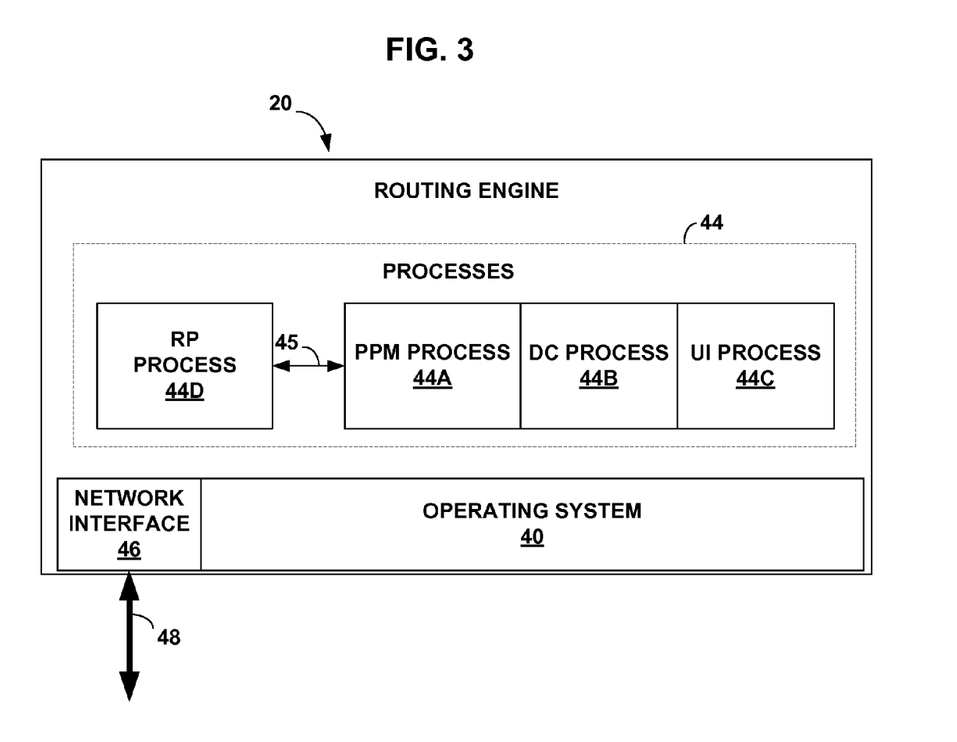
FIG. 3 is a block diagram illustrating an example routing engine that manages periodic communications with neighboring devices.

FIG. 3 is a block diagram illustrating in greater detail an example of routing engine 20 that manages periodic communications with neighboring devices consistent with the principles of the invention. Routing engine 20 includes an operating system 40 that provides a multi-tasking operating environment for execution of a number of concurrent processes 44. An example of such an operating system is FreeBSD, which is an advanced UNIX operating system that is compatible with a number of programmable processors, including commercially available processors.

Processes 44 include an RP process 44D that includes one or more threads that implement the various network protocols supported by routing engine 20. RP process 44D may include, for example, threads that implement protocols for exchanging route information with other routing devices and for updating routing information 30 (FIG. 1). RP process 44D may also include threads to support other protocols, such as threads that implement a TCP/IP network stack. RP process 44D may further include a RP scheduler (not shown), which may create a non-preemptive environment within RP process 44D for execution of a number of threads. More specifically, the complex RPs and other functions performed by RP process 44D often require a non-preemptive environment to avoid synchronization issues. The internal threads of execution of RP process 44D may execute to completion, and may be invoked by the internal scheduler.

Processes 44 further include a PPM process 44A that is responsible for managing periodic communications with neighboring devices, including outbound and inbound periodic communications. In other words, PPM process 44A manages the time critical periodic messages, while RP process 44D implements the complex RPs and other functions within an internal non-preemptive environment. In this manner, RP process 44D and PPM process 44A operate in a multi-tasking environment to ensure that PPM process 44A has sufficient resources to respond to periodic messages within the required response time. Operating system 40 may execute PPM process 44A as a high priority process, meaning computing resources may be made available for PPM process 44A before any lower priority processes. For example, RP process 44D may be using the computing resources of operating system 40. Operating system 40 may transfer the computing resources to PPM process 44A before RP process 44D is finished when PPM process 44A has periodic messages that need to be sent. Executing PPM process 44A as a high priority process may reduce network thrashing, allow for quicker detection of network events, etc. Other preemptive processes 42 may include a device configuration (DC) process 44B that controls the physical configuration of routing engine 20, and a user interface (UI) process 44C that provides an interface by which a remote system administrator or script can control and configure routing engine 20.

RP process 44D and PPM process 44A may communicate via an interprocess communication channel 45. More specifically, interprocess communication channel 45 allows RP process 44D and PPM process 44A to exchange messages, parameter, indications and like. RP process 44D may send inbound and outbound configuration parameters to PPM process 44A. For example, RP process 44D may load outbound configuration parameters to PPM process 44A. Outbound configuration parameters may include a fully formed periodic packet and a periodic time interval. PPM process 44A may store the loaded configuration information in a data structure, and communicate with neighboring devices in accordance with the outbound configuration parameters. In particular, when the time interval specified expires, router 16 may send the fully formed packet to neighboring devices. The fully formed packet may indicate the state of a device, the state of a link, or the like.

Furthermore, RP process 44D may load inbound configuration parameters, which may include a periodic time interval and an identifier for a neighboring device, to PPM process 44A. The identifier specifying the neighboring device may be an IP address, a MAC address, or the like. PPM process 44A may, again, store the loaded configuration parameters in a data structure, and communicate with neighboring devices in accordance with the configuration parameters. In particular, router 16 initiates a timer, and commences to monitor for incoming packets from the indicated neighboring device.

Routing engine 20 may further comprise a network interface 46 that provides a hardware interface for receiving and sending packets. Network interface 46 may be, for example, a network interface card (NIC) coupled to IFC's 24 (FIG. 2), or forwarding engine 22, via link 48.

Figure 4:
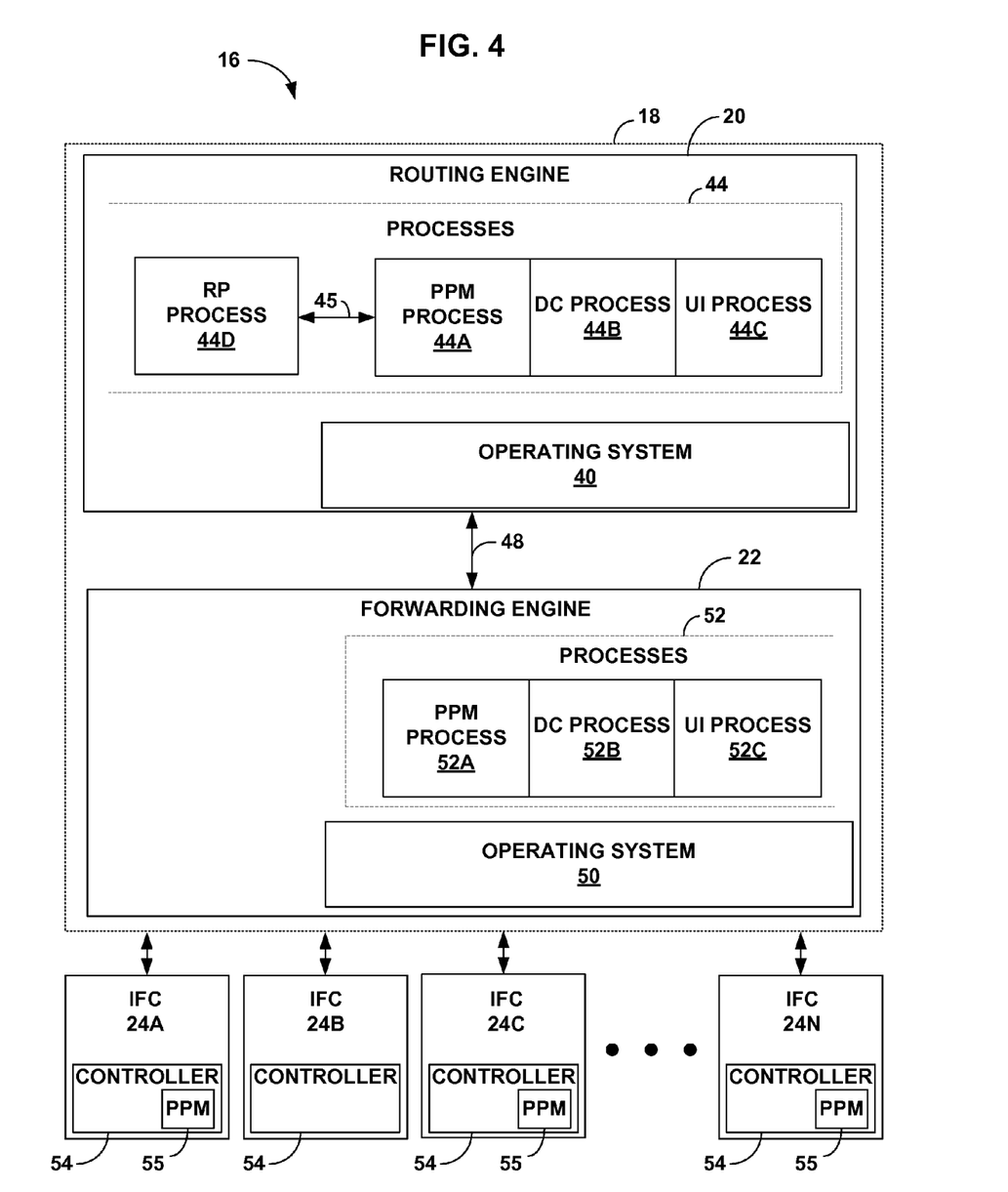
FIG. 4 is a block diagram illustrating an exemplary router that distributes the management of periodic communications across multiple periodic packet management processes.

FIG. 4 is a block diagram illustrating an exemplary router 16 that distributes the management of periodic communications across various components of the router. For example, management of periodic messages may be distributed across routing engine 20, forwarding engine, 22 and interface cards (IFCs) 24. Router 16 includes a routing engine 20 (described in FIG. 3) and a forwarding engine 22. In this example embodiment, forwarding engine 22 includes a real-time operating system 50 that provides a multi-tasking operating environment for execution of a number of concurrent processes 52.

Processes 52 executing on operating system 50 may include periodic PPM 52A that, like PPM 44A of FIG. 3, is responsible for managing a portion of the periodic communications with neighboring devices. Other of processes 52 executing concurrently on operating system 50 may include a device configuration (DC) process 52B that controls the physical configuration of forwarding engine 22, and a user interface (UI) process 52C that provides an interface by which a remote system administrator or script can control and configure forwarding engine 22. Processes 52 of forwarding engine 22 may instead be threads.

Router 16 further comprises a set of one or more IFCs 24A to 24N, collectively referred to as IFCs 24, for receiving and sending packets. IFCs 24 may include a controller 54 that performs control functions specific to the media type of IFC 24. Controller 54 may further implement a PPM process 55. However, each of IFCs 24 may not have sufficient intelligence to implement PPM process 55. In the embodiment shown in FIG. 4, IFC 24B does not implement a PPM process 55. PPM processes 55 implemented within controller 54 and PPM process 52A implemented within forwarding engine 22 receive inbound and outbound configuration parameters from RP process 44D.

When PPM process 55 of controller 54 receives an inbound periodic packet from a neighboring device for which controller 54 is not responsible for managing communications with, controller 54 relays the packet to PPM process 52A of forwarding engine 22. The packet may continue to be relayed up the chain of packet management processes until the packet arrives at the appropriate PPM process, or at RP process 44D.

Distributing PPM process 44A may reduce the time periods of a response from router 16. Distributing PPM process 44A may also prevent a bottleneck of link 48. Furthermore, router 16 may hold a larger number of conversations with neighboring devices.

Figure 5:
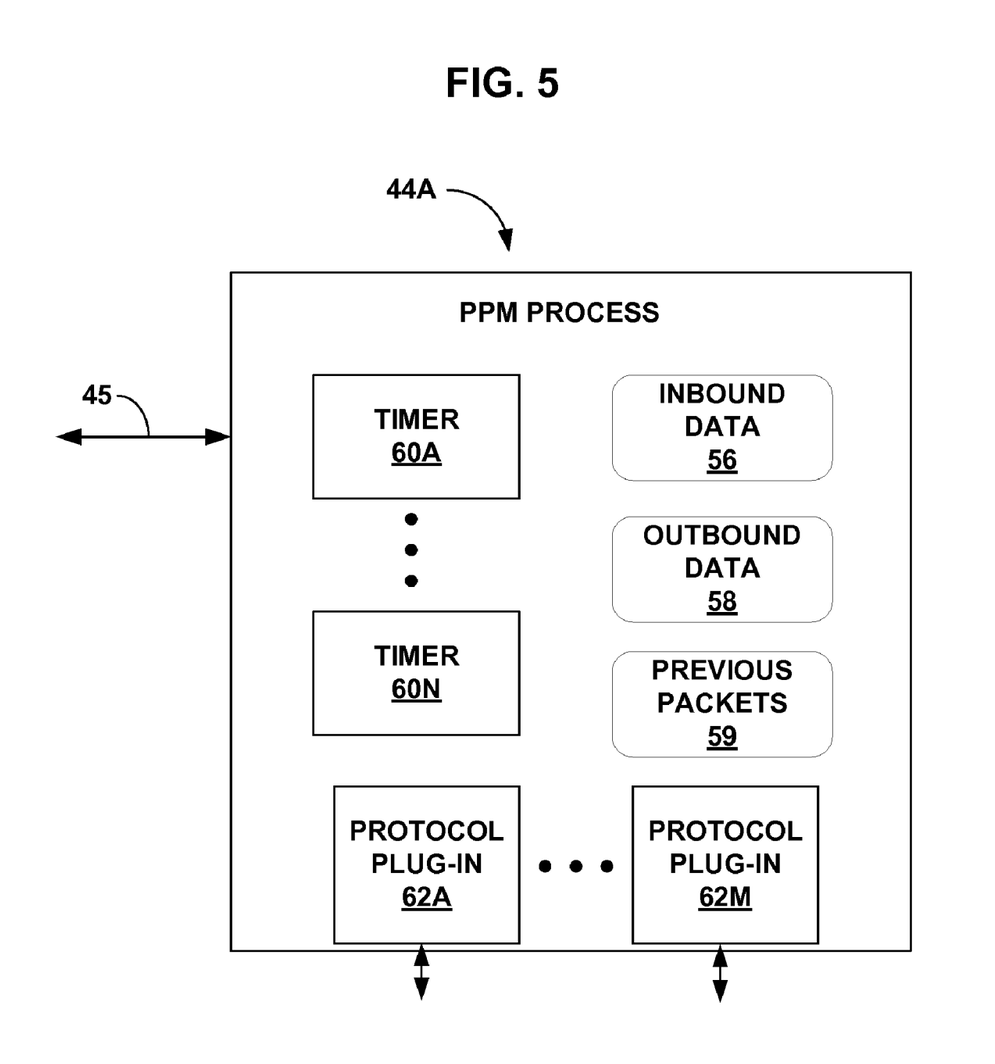
FIG. 5 is a block diagram illustrating an exemplary periodic packet management process that manages periodic communications with neighboring devices.

FIG. 5 is a block diagram illustrating an exemplary PPM process 44A that manages periodic communications with neighboring devices. PPM process 44A may receive, from RP process 44D, configuration parameters for inbound and outbound communication sessions. The configuration parameters from RP process 44D are stored in either an outbound configuration data structure 56 or an inbound configuration data structure 58. Alternatively, a single data structure may store both inbound and outbound configuration parameters. The data structures 56, 58 may be arranged as tables, trees, link lists, databases, flat files, and other data structures.

PPM process 44A may include a previous packet data structure 59 that stores copies of previously received inbound periodic packets. Previous packet data structure 59 may store a copy of previously received inbound periodic packets for equivalency comparison of later received periodic packets. For example, previous packet data structure may store the last periodic packet received for each communication session. PPM process 44A may create one previous packet data structure 59 for all communication sessions. Alternatively, PPM process 44A may create a separate previous packet data structure 59 for each communication session. Furthermore, the information contained in previous packet data structure 59 may, instead, be incorporated into the inbound configuration data structure 58. Previous packet data structure 59 may store a copy of incoming periodic packets for each source router identified by the configuration parameters.

PPM process 44A may further include timers 60A to 60N, collectively referred to as timers 60. Each of timers 60 may keep track of a time interval for a periodic communication session. Alternatively, one of timers 60 may keep track of time intervals for multiple periodic communication sessions. When one of timers 60 expires, PPM process 44A may either send a periodic packet to neighboring devices if timer 60 is timing an outbound communication session, or notify RP process 44D that PPM process 44A did not receive an expected periodic packet if timer 60 is timing an inbound communication session.

PPM process 44A may also include protocol plug-ins 62A to 62M, collectively referred to as protocol plug-ins 62. Protocol plug-ins 62 may contain protocol specific information for periodic communications. For example, protocol plug-ins 62 may contain protocol specific information for handling incoming or outgoing periodic packets that use authentication, sequence numbers, and the like. Furthermore, protocol plug-ins 62 may contain information regarding specific fields within the packet that indicate that the packet is periodic. For instance, protocol plug-ins 62 may contain information necessary to identify a "hello" field at the beginning of a packet and handle the packet accordingly.

Protocol plug-ins 62 may further contain protocol specific information that may determine whether an incoming periodic packet is "equivalent" to previous packets. For example, a protocol may use sequence numbers within a periodic packet communication causing each packet to be slightly different byte-wise. Protocol plug-ins may contain information regarding sequence numbers, and allow PPM process 44D to regard the packet as equivalent to previously received periodic packets. Protocol plug-ins 62 may be a dynamic digital link list, a static digital library of protocol information, or the like. When PPM process 44A needs protocol specific information to determine whether a packet is periodic or equivalent, PPM process 44A may accesses one of protocol plug-ins 62.

In general, PPM process 44A receives configuration parameters from RP process 44D and manages periodic communication sessions with neighboring devices in accordance with the configuration parameters.

Figure 6:
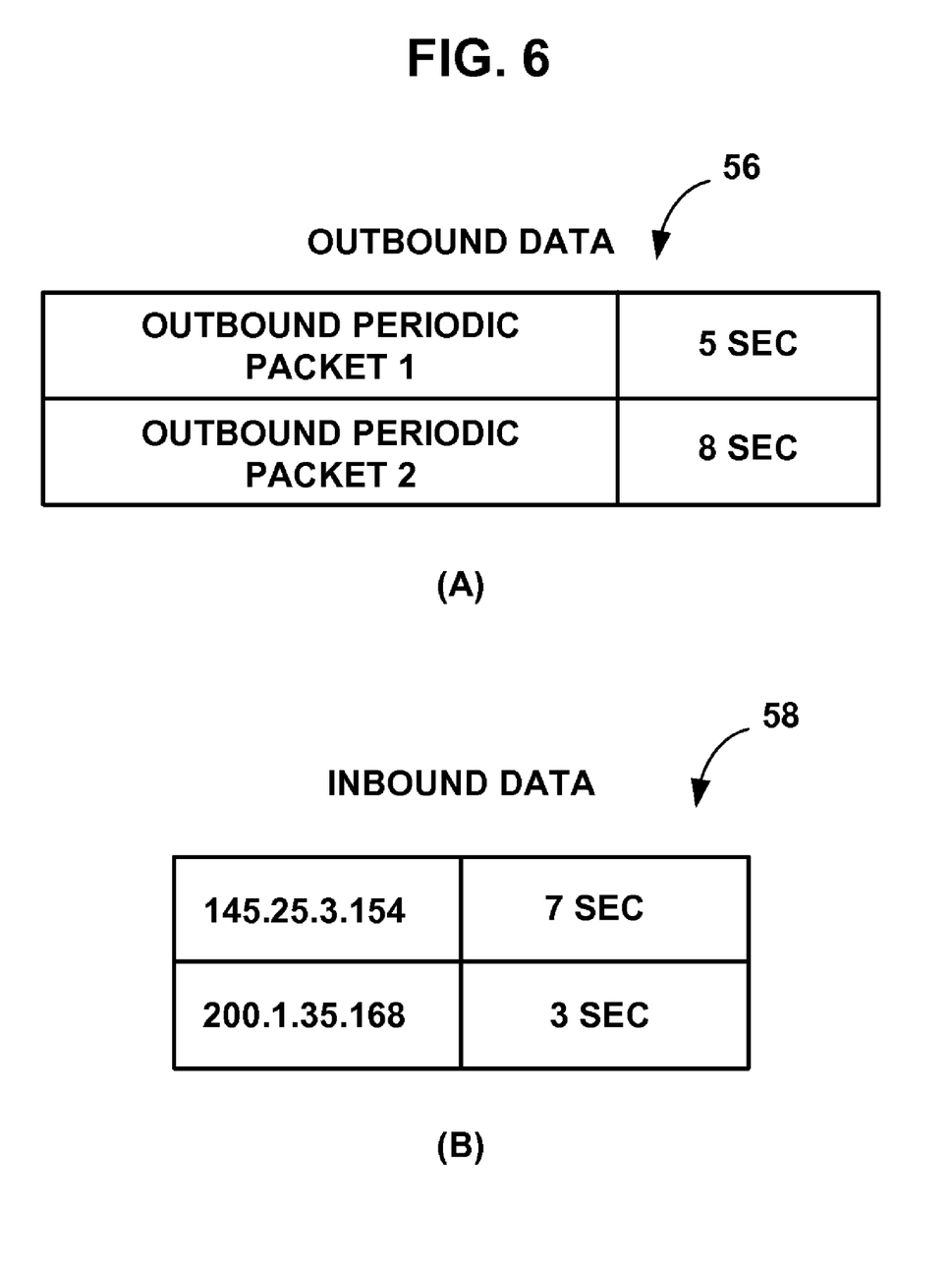
FIG. 6 is a block diagram illustrating exemplary data structures maintained by the periodic packet management process of FIG. 5.

FIG. 6 is a block diagram illustrating exemplary data structures 56, 58 maintained by PPM process 44A (FIG. 5) to manage periodic communications with neighboring routers. In the embodiment illustrated in FIG. 6A, outbound data structure 56 is a table in which each row represents an outbound periodic communication session that PPM process 44A may manage. For each outbound communication session, outbound data structure 56 may include a fully formed outbound periodic packet and a periodic time interval. PPM process 44A, for example, may send outbound periodic packet 1 every five seconds. The data of FIG. 4A is illustrated for exemplary purposes, and may be readily varied. For example, outbound data structure 56 may further include the protocol type of each outbound periodic packet, identifiers for neighboring network devices, and the like.

In the embodiment illustrated in FIG. 6B, inbound data structure 58 is a table in which each row represents an inbound periodic communication session that PPM process 44A may manage. For each inbound communication session, inbound data structure 58 may include a source device identifier and a time interval. The identifier may be an Internet Protocol (IP) address, a Media Access Control (MAC) address or the like. PPM process 44A monitors for an incoming periodic packet from the neighboring router associated with the identifier. For example, PPM process 44A may begin a timer 60 for the communication session with the neighboring device with IP address 145.25.3.154. PPM process 44A may monitor for incoming periodic packets from the neighboring device with IP address 145.25.3.154. The data of FIG. 4A is illustrated for exemplary purposes, and may be varied in other embodiments. For example, inbound data may contain a periodic packet to compare future incoming periodic packets to, multiple periodic packets to compare future incoming periodic packets to, protocol specific information or the like.

Figure 7:
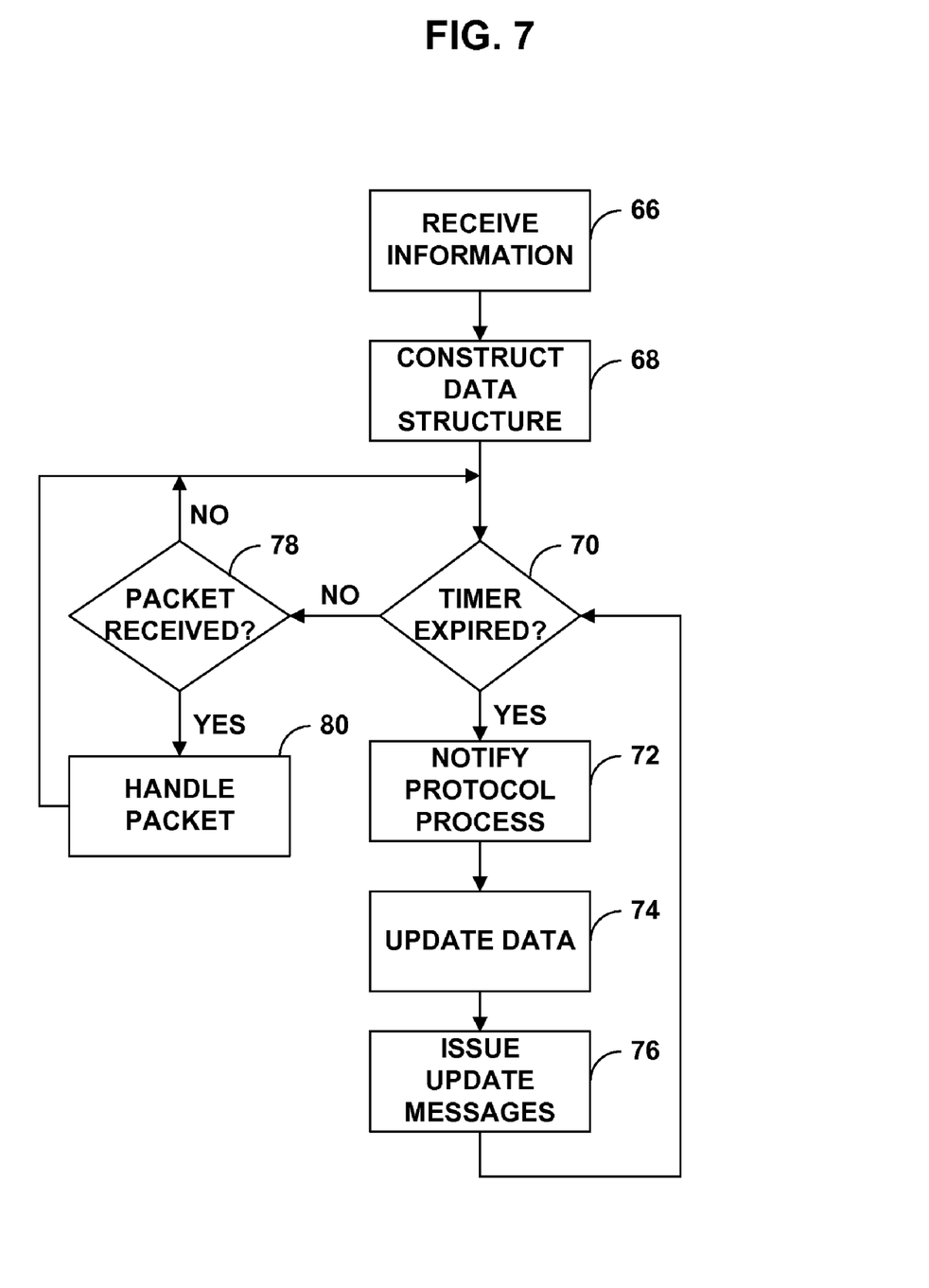
FIG. 7 is a flowchart illustrating an exemplary mode of operation of router 16 of FIG. 2 when managing inbound periodic communications in accordance with the principles of the invention.

FIG. 7 is a flowchart illustrating an exemplary mode of operation of router 16 of FIG. 2 when managing inbound periodic communications in accordance with the principles of the invention. Initially, PPM process 44A receives from RP process 44D configuration parameters for inbound periodic communications (66). The inbound configuration parameters may include an identifier for a neighboring source network device, such as an IP address, a MAC address, or the like. The inbound configuration parameters may further include a periodic time interval. Furthermore, inbound configuration parameters may include a periodic packet to compare future incoming periodic packets to, multiple periodic packets to compare future incoming periodic packets to, protocol specific information or the like. PPM process 44A constructs inbound data structure 56, which contains the inbound configuration parameters from RP process 44D (68).

Periodic management process 44A checks to see if an inbound timer 60 has expired (70). When inbound timer 60 expires PPM process 44A notifies RP process 44D that PPM process 44A did not receive an expected packet from a neighboring device (72). For example, PPM process 44A may send an indication to RP process 44D that indicates a device identifier, such as an IP address or MAC address, and failure message. RP process 44D may assume the neighboring device is unroutable, i.e. a packet must be sent via a new route if the route path includes the neighboring device that failed. A network device may become unroutable if a link has failed, the device has failed, or the like. RP process 44D may update the routing data to reflect the unavailability of routes through the device (74). Router 16 may proceed to broadcast an update messages to neighboring router devices to indicate the failure of the routes including the neighboring device (76).

When no inbound timer 60 has expired, PPM process 44A monitors for inbound packets until the time comes to check inbound timers 60 again (78). When PPM process 44A receives an inbound packet before the next timer 60 check, the PPM process 44A handles the inbound packet (80). PPM process 44A may handle periodic and non-periodic packets differently as described below.

Figure 8:
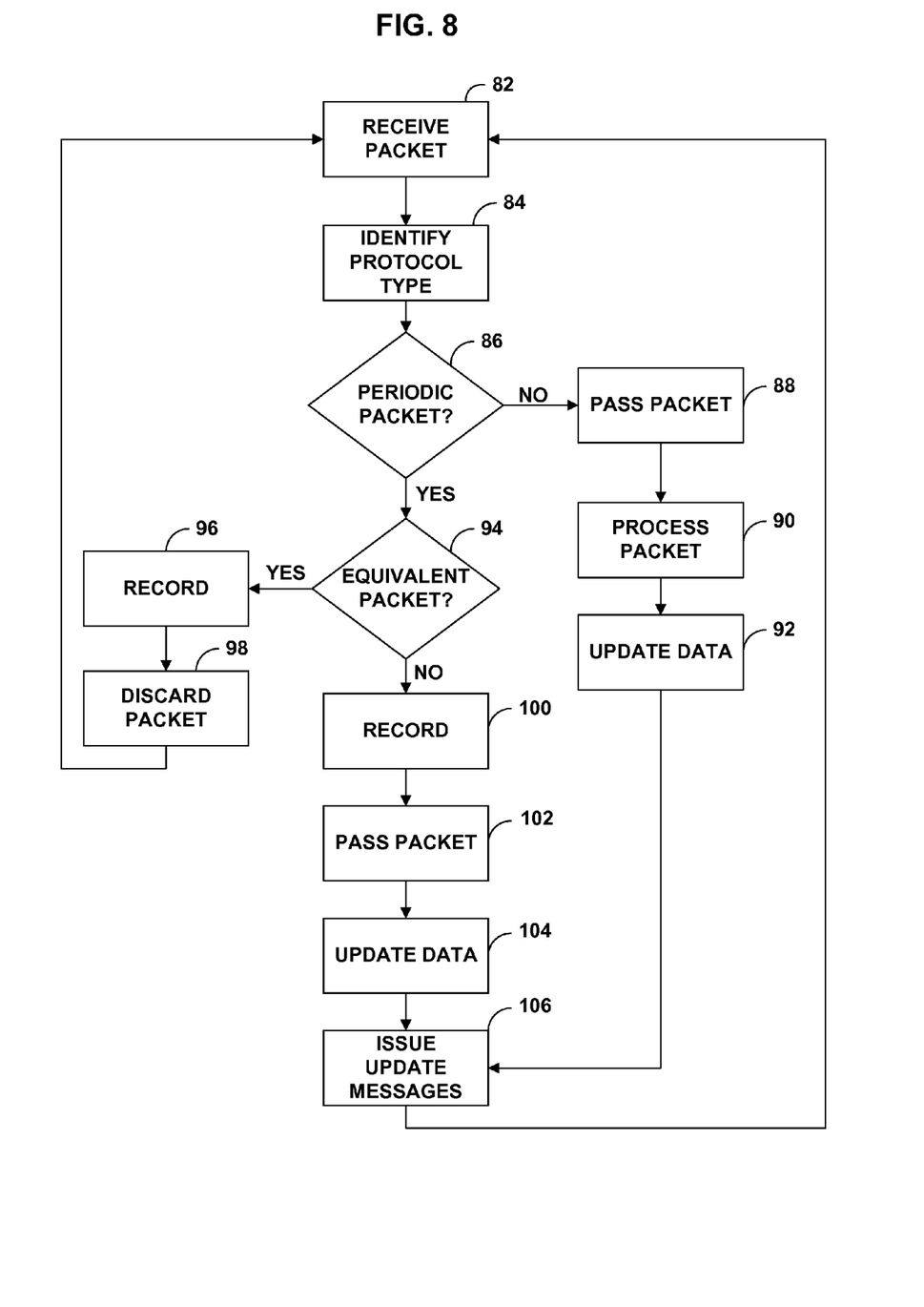
FIG. 8 is a flowchart illustrating an exemplary mode of operation of router 16 of FIG. 2 when managing inbound periodic messages in accordance with the principles of the invention.

FIG. 8 is a flowchart illustrating an exemplary mode of operation of router 16 of FIG. 2 when managing inbound periodic messages in accordance with the principles of the invention. PPM process 44A receives an inbound packet from a neighboring network device (82). PPM process 44A may identify the protocol type of the packet (84). Using protocol specific information from one of protocol plug-ins 62, PPM process 44A may determine whether the inbound packet is periodic (86). For instance, protocol plug-in 62 may contain information such that PPM process 44A may identify the type of message, such as a hello or a keepalive, by identifying a field within the packet. Alternatively, PPM process 44A may do a byte-wise comparison of the packet with the previous incoming packets of previous packet data structure 59. If the incoming packet matches previous packets, PPM process 44A may regard the packet as a periodic packet and handle accordingly. Furthermore, in doing the byte-wise comparison, PPM process 44A may access one of plug-ins 62 to identify packets that contain the same semantic information, but the packet protocol requires sequence numbers, authentication, and the like.

When the packet is not periodic, PPM process 44A communicates the packet to RP process 44D via interprocess communication channel 45 (88). RP process 44D may process the packet and update routing information, routing protocol data or the like (90, 92). If necessary, RP process 44D may broadcast update messages that indicate to neighboring devices changes in the network topology (106). For example, router 16 may receive a Border Gateway Protocol (BGP) packet that contains updated routing information.

When the packet is periodic, PPM process 44A determines whether the periodic packet is equivalent to previously received periodic packets (94). To determine whether a packet is equivalent to previous packets, PPM process 44A may do a byte-wise comparison of the packet to a previously received periodic packet stored in previous packet data structure 59. Previous packet data structure 59 may store a copy of previously received inbound periodic packets for equivalency comparison of later received periodic packets. For example, previous packet data structure may store the last periodic packet received for each communication session. PPM process 44A may maintain a separate periodic packet data structure 59 for each source address of a neighboring device.

When the periodic packet is equivalent to previously received periodic packets, PPM process 44A makes a record of receiving the packet, and then discards the packet (96, 98). PPM process 44A may make a record of receiving the packet by copying the contents of the packet into periodic packet data structure 59 for future comparisons. Furthermore, PPM process 44A may reset the corresponding timer 60 to begin tracking the amount of time that elapses since receiving the last incoming packet.

When the periodic packet is not equivalent to previously received periodic packets, PPM process 44A makes a record of receiving the periodic packet, and then communicates the packet to RP process 44D (100, 102). Again, PPM process 44A may copy the contents of the packet into periodic packet data structure 59 for future comparisons, and reset the corresponding timer 60. RP process 44D may update routing data, RP information, or the like (104). Furthermore, RP process 44D may broadcast update messages that indicate changes in network topology (106).

Figure 9:
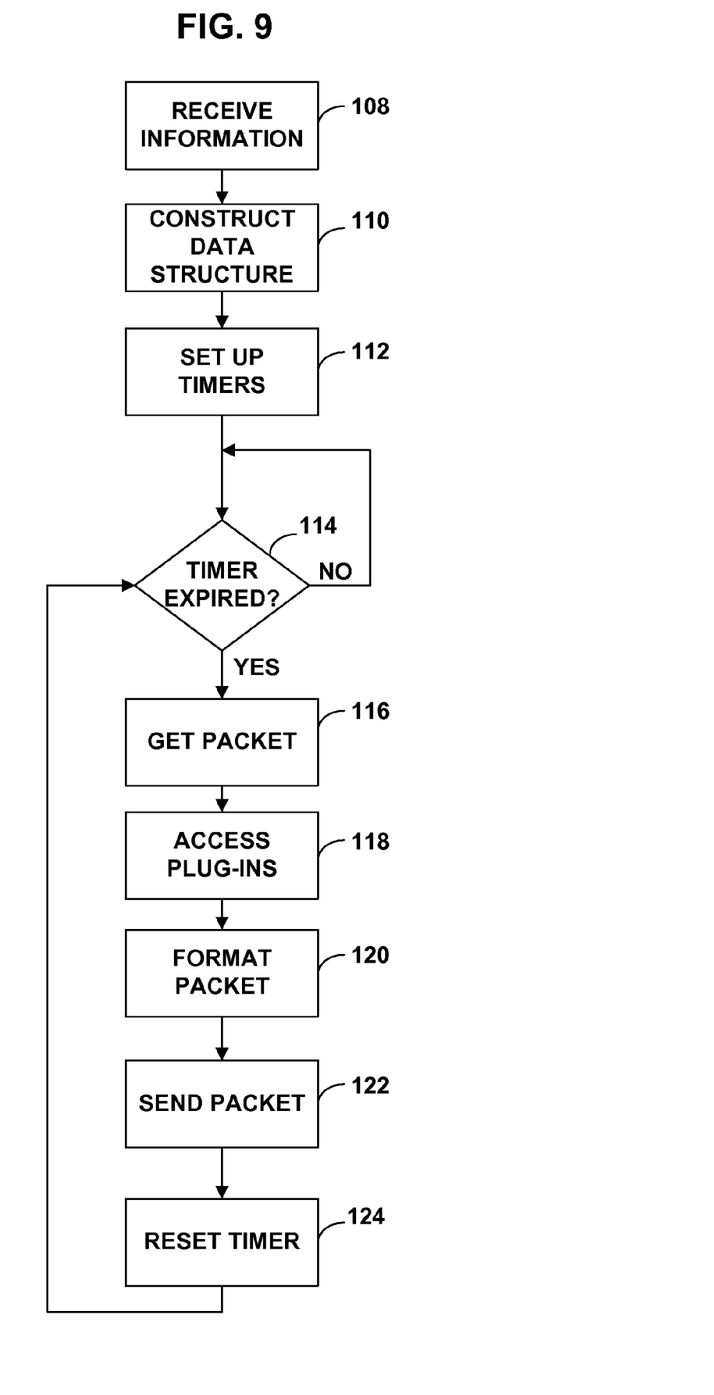
FIG. 9 is a flowchart illustrating an exemplary mode of operation of router 16 of FIG. 2 when managing outbound periodic communications in accordance with the principles of the invention.

FIG. 9 is a flowchart illustrating an example mode of operation of router 16 of FIG. 2 when managing outbound periodic communications in accordance with the principles of the invention. Initially, PPM process 44A receives outbound configuration parameters from RP process 44D (108). PPM process 44A constructs outbound data structure 56, with the configuration parameters from RP process 44D (110). In addition, PPM process 44A proceeds to set up outbound timers 60 (112). One timer 60 may be set up for each of the periodic communication sessions. As mentioned before, one of timers 60 may keep track of more than one communication session. For example, if two of the outbound communication sessions have equivalent periodic time intervals, one timer 60 may track the time since the last periodic packet was sent for both of the communication sessions simultaneously. PPM process 44A frequently checks timers 60 to see whether any of timers 60 has expired (114). If all of timers 60 are still active, i.e. not expired, PPM process 44A continues to frequently check timers 60.

When one or more of timers 60 expires, PPM process 44A retrieves the corresponding packet from outbound data structure 56 (116). PPM process 44A may access appropriate ones of protocol plug-ins 62 to format the packet, if necessary (118, 120). For example, when a protocol demands use of sequence numbers, PPM process 44A may access the appropriate one of protocol plug-ins 62 and insert the sequence number into the outgoing packet. PPM process 44A sends the packet out to the appropriate neighboring routers, and resets timer 60 (122, 124).

A number of embodiments of the present invention have been described. Nevertheless, it will be understood that various modifications may be made without departing from the spirit and scope of the invention. For example, although the embodiments herein have been described as packet-based, any data type may be used without departing from the periodic processing systems and methods described herein. Further, the techniques described may be used for processing periodic communications between two devices. Accordingly, other embodiments are within the scope of the following claims.

The invention claimed is:

1. A network device comprising:
a first preemptive software process executing within an operating system executing on the network device, the first preemptive software process managing processing of non-periodic routing operations for one or more routing protocols executed by the network device; and
a second preemptive software process executing within the operating system, the second preemptive software process managing processing of at least a portion of periodic routing operations performed by the network device;
wherein the operating system transfers computing resources of the network device from the first preemptive software process to the second preemptive software process for processing of the periodic routing operations prior to the first preemptive software process finishing the processing of the non-periodic routing operations for the one or more routing protocols when the second preemptive software process has one or more periodic messages to be sent.

2. The device of claim 1, further comprising providing a non-preemptive operating environment within the first preemptive software process for execution of a plurality of threads to manage the processing of the non-periodic routing operations for the one or more routing protocols.

3. The device of claim 2, wherein the first preemptive software process includes a scheduler that schedules the plurality of threads such that each of the threads executes to completion without preemption by any of the other threads of the first preemptive software process.

4. The device of claim 2, wherein the plurality of threads of the first preemptive software process require execution within a non-preemptive environment.

5. The device of claim 1, further comprising:
a control unit that maintains the first preemptive software process and the second preemptive software process, the second preemptive software process managing processing of a first portion of the periodic routing operations; and
at least one interface card coupled to the control unit that includes a periodic communication management process that manages processing of a second portion of the periodic routing operations in accordance with the one or more routing protocols.

6. The device of claim 5, wherein the at least one interface card receives a periodic routing communication, determines that periodic communication management process of the interface card is not responsible for managing the received periodic routing communication and relays the periodic routing communication to the second preemptive software process of the control unit for processing.

7. The device of claim 5, wherein the at least one interface card receives a periodic routing communication, determines that periodic communication management process of the interface card is responsible for managing the received periodic routing communication and responds to the periodic routing communication.

8. The device of claim 5, wherein the control unit further comprises:
a routing engine that maintains the first preemptive software process and the second preemptive software process that execute within a first operating system; and
a forwarding engine that includes a third software process that executes within a second operating system of the network device, the third software process managing processing of a third portion of the periodic routing operations of the one or more routing protocols.

9. The device of claim 1, further comprising a control unit that includes:
a routing engine that maintains the first preemptive software process and the second preemptive software process that execute within a first operating system, the second preemptive software process managing processing of a first portion of the periodic routing operations of the one or more routing protocols; and
a forwarding engine that includes a third software process that executes within a second operating system of the network device, the third software process managing processing of a second portion of the periodic routing operations of the one or more routing protocols.

10. The device of claim 1, wherein the periodic routing operations include periodic network communications exchanged with one or more neighboring network devices in accordance with the one or more routing protocols.

11. The device of claim 1, wherein the periodic routing operations include periodic network communications exchanged with one or more neighboring network devices to communicate one of states of the network devices and states of one or more links.

12. A method for managing routing protocol communications comprising:
   managing processing of non-periodic routing operations for one or more routing protocols executed by the network device with a first preemptive software process executing within an operating system executing on the network device;
   managing processing of at least a portion of periodic routing operations performed by the network device with a second preemptive software process executing within the operating system; and
   transferring computing resources of the network device from the first preemptive software process to the second preemptive software process to process the periodic routing operations prior to the first preemptive software process finishing the processing of the non-periodic routing operations for the one or more routing protocols when the second preemptive software process has one or more periodic messages to be sent.

13. The method of claim 12, wherein managing processing of non-periodic routing operations for one or more routing protocols comprises managing processing of the non-periodic routing operations for the one or more routing protocols with a plurality of non-preemptive execution threads of the first preemptive software process.

14. The method of claim 13, further comprising scheduling the plurality of non-preemptive execution threads such that each of the threads executes to completion without preemption by any of the other non-preemptive execution threads of the first preemptive software process.

15. The method of claim 13, wherein the plurality of non-preemptive execution threads of the first preemptive software process require execution within a non-preemptive environment.

16. The method of claim 12, further comprising:
   maintaining the first preemptive software process and the second preemptive software process executing within the operating system of a centralized control unit;
   managing processing of a first portion of the periodic routing operations for the one or more routing protocols with the second preemptive software process; and
   managing processing of a second portion of the periodic routing operations for the one or more routing protocols with a periodic communication management process of at least one interface card coupled to the centralized control unit.

17. The method of claim 16, wherein managing processing of the second portion of the periodic routing operations with the at least one interface card comprises:
   receiving a periodic routing communication from a network
   determining that periodic communication management process of the interface card is not responsible for managing the received periodic routing communication; and
   relaying the periodic routing communication to the second preemptive software process of the centralized control unit.

18. The method of claim 16, wherein managing processing of the second portion of the periodic routing communications with the at least one interface card comprises:
   receiving a periodic routing communication from a network,
   determining that periodic communication management process of the interface card is responsible for managing the received periodic routing communication; and
   responding to the periodic routing communication.

19. The method of claim 16, further comprising:
   maintaining the first preemptive software process and the second preemptive software process executing within a first operating system of a routing engine of the centralized control unit; and
   maintaining a third software process executing within a second operating system of a forwarding engine of the centralized control unit;
   managing, using the third software process, processing of a third portion of the periodic routing operations for the one or more routing protocols.

20. The method of claim 12, further comprising:
   maintaining the first preemptive software process and the second preemptive software process executing within a first operating system of a routing engine of a centralized control unit;
   managing processing a first portion of the periodic routing operations with the second preemptive software process; and
   maintaining a third software process executing within a second operating system of a forwarding engine of the centralized control unit;
   managing, using the third software process, processing of a second portion of the periodic routing operations for the one or more routing protocols.

21. The method of claim 12, wherein the periodic routing operations include periodic network communications exchanged with one or more neighboring network devices in accordance with the one or more routing protocols.

22. The method of claim 12, wherein the periodic routing operations include periodic network communications exchanged with one or more neighboring network devices to communicate one of a state of the network devices and a state of one or more links.

23. A computer-readable storage medium comprising instructions that cause at least one processor to:
   manage processing of non-periodic routing operations for one or more routing protocols executed by the network device with a first preemptive software process executing within an operating system executing on the network device;
   manage processing of at least a portion of periodic routing operations performed by the network device with a second preemptive software process executing within the operating system; and
   transfer computing resources of the network device from the first preemptive software process to the second preemptive software process to process the periodic routing operations prior to the first preemptive software process finishing the processing of the non-periodic routing operations for the one or more routing protocols when the second preemptive software process has one or more periodic messages to be sent.

24. The computer-readable storage medium of claim 23, wherein instructions to manage processing of non-periodic routing operations for one or more routing protocols comprise instructions to manage processing of the non-periodic routing operations for the one or more routing protocols with a plurality of non-preemptive execution threads of the first preemptive software process.

25. The computer-readable storage medium of claim 24, further comprising instructions that cause the processor to schedule the plurality of non-preemptive execution threads such that each of the threads executes to completion without preemption by any of the other non-preemptive execution threads of the first preemptive software process.

26. The computer-readable storage medium of claim 24, wherein the plurality of non-preemptive execution threads of the first preemptive software process require execution within a non-preemptive environment.

27. The computer-readable storage medium of claim 23, wherein the periodic routing operations include periodic network communications exchanged with one or more neighboring network devices to communicate one of a state of the network devices and a state of one or more links.

28. A network device comprising:
- a first preemptive software process executing within an operating system executing on the network device, wherein the first preemptive software process includes:
  - a plurality of threads executing within the first preemptive software process to manage processing of non-periodic routing operations for one or more routing protocols executed by the network device, wherein the plurality of threads require execution within a non-preemptive environment;
  - a scheduler that schedules the plurality of threads such that each of the threads executes to completion without preemption by any of the other threads of the plurality of threads; and
- a second preemptive software process executing within the operating system, the second preemptive software process managing processing of at least a portion of periodic routing operations performed by the network device;
- wherein the operating system transfers computing resources of the network device from the first preemptive software process to the second preemptive software process for processing of the periodic routing operations prior to the first preemptive software process finishing the processing of the non-periodic routing operations for the one or more routing protocols when the first preemptive software process has one or more periodic messages to be sent.

* * * * *